United States Patent [19]

Tomite et al.

[11] Patent Number: 4,707,630

[45] Date of Patent: Nov. 17, 1987

[54] MAGNETIC COVER MEMBER FOR MAGNETIC POLES OF DC MOTOR

[75] Inventors: Tosio Tomite; Tatsuhiro Tani; Hidemitsu Kobayashi, all of Katsuta, Japan

[73] Assignee: Hitachi, Ltd., Tokyo, Japan

[21] Appl. No.: 816,449

[22] Filed: Jan. 6, 1986

[30] Foreign Application Priority Data

Jan. 14, 1985 [JP] Japan .................................. 60-3267

[51] Int. Cl.[4] ............................................ H02K 23/04
[52] U.S. Cl. ..................................... 310/154; 310/42; 310/89
[58] Field of Search ............... 310/67 R, 89, 106, 153, 310/154, 254, 42

[56] References Cited

U.S. PATENT DOCUMENTS

| | | | |
|---|---|---|---|
| 2,971,107 | 2/1961 | Jin | 310/239 |
| 3,265,913 | 8/1966 | Irwin | 310/153 |
| 4,137,884 | 2/1979 | Odazima et al. | 310/153 |
| 4,338,533 | 7/1982 | Gräfenschnell | 310/154 |
| 4,580,072 | 4/1986 | Morishita | 310/154 |
| 4,587,449 | 5/1986 | West | 310/154 |

FOREIGN PATENT DOCUMENTS

| | | |
|---|---|---|
| 154335 | 11/1985 | European Pat. Off. . |
| 144004 | 12/1985 | European Pat. Off. . |
| 54-60375 | 11/1980 | Japan .................................. 310/154 |
| 59-23180 | 5/1984 | Japan .................................. 310/153 |

OTHER PUBLICATIONS

Journal of NIPPONDENSO Technical Disclosure, No. 30–39, Apr. 20, 1983, p. 39.

Primary Examiner—Patrick R. Salce
Assistant Examiner—D. L. Rebsch
Attorney, Agent, or Firm—Antonelli, Terry & Wands

[57] ABSTRACT

In a permanent type DC motor, a stator comprises a yoke and a plurality of magnetic pole pairs composed of permanent magnets and auxiliary poles. The plurality of magnetic pole pairs are held and fixed in intimate contact with the yoke by pressingly deforming a cylindrical thin plate made of magnetic material such as a steel plate. The fixture of the magnetic pole pairs composed of the permanent magnets and auxiliary poles is attained by a projecting part formed by pressingly deforming a part of the thin cylindrical plate made of the magnetic material toward a space between the adjacent pole pairs and by using U-shaped magnetic retaining pieces.

6 Claims, 7 Drawing Figures

MAGNETIC COVER MEMBER FOR MAGNETIC POLES OF DC MOTOR

FIELD OF THE INVENTION AND RELATED ART STATEMENT

The present invention relates to a permanent magnet type DC motor, and more particularly to a magnet type DC motor having a magnet fixture structure, which is capable of firmly fixing magnetic poles to a yoke without any adhesive while improving its performance. The motor is used for starting an automotive engine, which requires higher performance and durability of the motor.

Such a structure that uses permanent magnets, i.e., ferrite magnets and auxiliary poles made of soft iron are separately produced and then are bonded with adhesives to a cylindrical yoke, is popular in a conventional stator of a magnet type DC motor for starting an automotive engine. However, if the magnet poles are bonded with adhesives to the yoke, since the ferrite magnets or the like are fragile, the prior art structure suffers from a defect that the magnets would be cracked due to a difference in thermal expansion coefficient between the yoke and magnets or to an accidental shock. This difficulty should be overcome for practical use.

To overcome this difficulty, Japanese Patent Unexamined Publication 54861/83 discloses a structure in which inner circumferential surfaces of ferrite magnets are protected and held by a cylindrical magnet cover made of non-magnetic thin plate material such as aluminum. However, with such a structure the cylindrical magnet cover made of non-magnetic thin plate material such as aluminum is inserted pressingly into the inside of the magnets, and because the magnets are covered by the non-magnetic material, the magnetic resistance is increased, to degrade the performance of the DC motor particularly for a magnetic pole arrangement in which auxiliary poles are juxtaposed with the permanent magnets for generating a higher torque (in this case, a gap between the magnets and the armature is increased, corresponding to a thickness of the magnet cover made of non-magnetic material).

In contrast, Japanese Patent Unexamined Publication Nos. 16561/82 and 6759/84 propose a structure in which an inner circumferential surface of ferrite magnets is protected and held by a resilient support member made of magnetic thin plate material. This structure uses a magnetic thin plate material which is easily magnetically saturated, and it would be possible to decrease leakage of magnetic flux between the magnetic poles to improve its performance. However, this structure is of the type where the magnetic poles are pressingly held radially outwardly against the inner circumferential surface of the yoke essentially by utilizing a resilient force. Accordingly, it is impossible to hold the overall surfaces of the magnetic poles and the resilient support members in uniform contact due to the non-uniformity in dimensions such as inner and outer diameters and radii of curvature of the yoke, ferrite magnets and auxiliary poles. The fixing strength would not be necessarily satisfactory and also, vibration resistance would be insufficient. The structure further suffers from a disadvantage in which performance of the DC motor would degrade due to the widening of the gap and nonuniformity of the gap.

OBJECT AND SUMMARY OF THE INVENTION

Accordingly, to overcome the above-noted defects, it is an object of the invention to provide a permanent magnet type DC motor having a stator structure which is superior in holding structure for a yoke and magnetic poles, is mechanically durable satisfactorily against a rapid temperature variation, a large shock and an invasion of moisture, and is capable of firmly fixing with an excellent contact between the magnetic poles and the magnet cover, while reducing a gap between the magnet units and the armature with a higher performance.

This and other objects of the invention are attained by providing a stator structure of a permanent magnet type DC motor having a plurality of pairs of auxiliary poles and permanent magnets on an inner circumferential surface of a yoke, wherein a cylindrical magnet cover made of magnetic thin plate material is disposed in an inner circumferential surface of the magnet poles and the magnet cover is pressed from its inside to subject the magnet cover to a permanent deformation so that the magnet cover is held in uniform and intimate contact with the overall inner surface of the magnet poles, whereby the magnetic poles are firmly held and fixed to the inner circumferential surface of the yoke and a gap between the magnetic pole unit and the armature is made smaller and more uniform to reduce magnetic resistance, and to improve electric performance.

According to another aspect of the invention, in a stator structure of a permanent magnet type DC motor having a plurality of pairs of auxiliary poles and permanent magnets on an inner circumferential surface of a yoke, a resilient retaining piece is fixed to the yoke between the adjacent pairs of auxiliary poles and permanent magnets, the magnetic poles are fixedly held along the inner circumferential surface of the yoke between the adjacent resilient retaining pieces, a cylindrical magnet cover of magnetic thin plate material is disposed on the inner circumferential surface of the magnet poles, and the magnet cover is pressed from its inside to be subjected to a permanent deformation to thereby hold the magnet cover in unform and intimate contact with the overall inner surface of the magnetic poles, whereby in cooperation with the pressing forces of the resilient retaining pieces and the magnet cover, the magnetic poles are firmly fixed to the inner circumferential surface of the yoke and a gap between the magnetic pole units and the armature is made small and uniform to reduce a magnetic resistance and to improve electric performance.

BRIEF DESCRIPTION OF THE DRAWINGS

In the accompanying drawings:

FIGS. 2a and 2b are a cross-sectional view of a stator for a permanent magnet type DC motor in accordance with a first embodiment of the invention and a longitudinal sectional view taken along the line IIb—IIb of FIG. 2a.

DETAILED DESCRIPTION OF THE PREFERRED EMBODIMENTS

The present invention will now be described with reference to the accompanying drawings.

Figure 1:
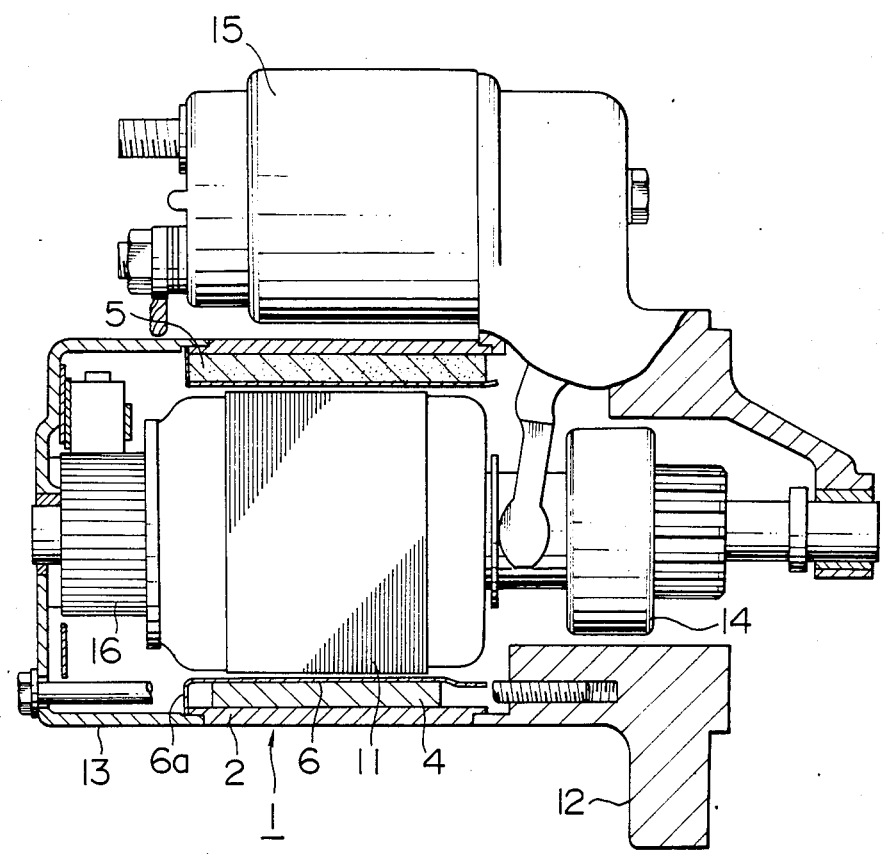
FIG. 1 is a fragmentary cross-sectional view of a primary part of a permanent magnet type DC motor related to the present invention.

FIG. 1 is a partially fragmentary cross-sectional view of a permanent magnet type DC motor, showing an example of a stator thereof according to the present invention. In FIG. 1, there is shown a magnet type DC motor in which a yoke 2 of the stator 1 and an armature 11 having a commutator 16 and a pinion clutch 14 are held between an end bracket 13 and a gear case 12 having a switch 15. The stator 1 includes a plurality of auxiliary poles 4 and a plurality of permanent magnets 5 which are juxtaposed on an inner circumferential surface of the cylindrical yoke 2. A cylindrical magnet cover or holder 6 made of a magnetic thin plate is provided in contact with an inner circumferential surface of the magnetic poles.

Figure 2A:
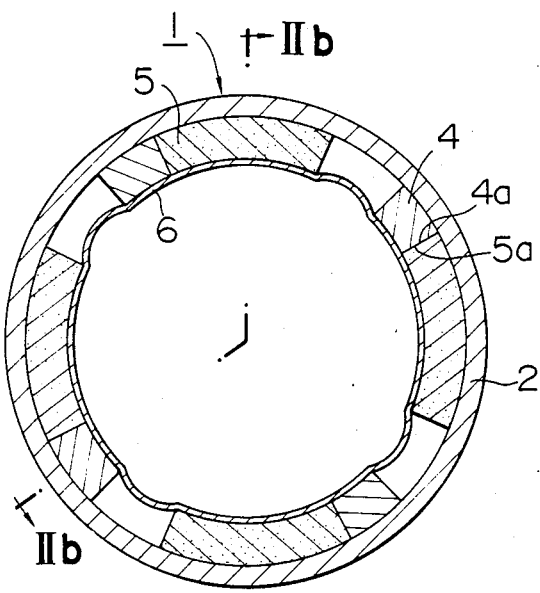
Figure 2B:
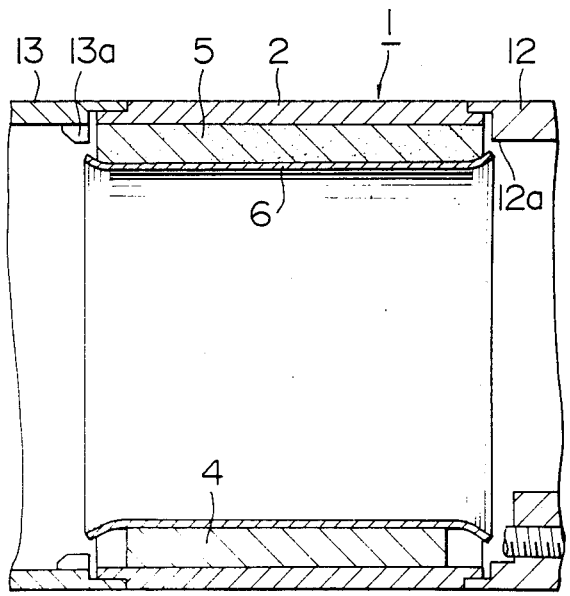

FIGS. 2a and 2b are a transversal cross-sectional view of a stator 1 of a magnet type DC motor similar to that shown in FIG. 1 in accordance with an embodiment of the invention, and a longitudinal sectional view taken along the line IIb—IIb of FIG. 2a. In FIGS. 2a and 2b, a plurality (four) of auxiliary poles 4 and a plurality (four) of permanent magnets 5 (ferrite magnets or the like) are arranged on the inner circumferential surface of the cylindrical yoke 2 so that a side face 4a of each of the auxiliary poles 4 and a side face 5a of each of the permanent magnets 5 are held in contact with each other and the other side faces of the auxiliary poles and permanent magnets confront with each other at a space. Then, the cylindrical magnet cover or holder 6 made from a magnetic thin plate such as a thin steel plate is provided in contact with the inner circumferential surface of the magnetic poles. The cylindrical magnet cover 6 is permanently deformed radially outwardly toward the inner circumferential surface of the yoke 2 so that the cover 6 is held in intimate contact with the overall circumferential surfaces of the auxiliary poles 4 and the permanent ferrite magnets 5 uniformly both in its circumferential and axial directions. At the spaces between the auxiliary poles 4 and the permanent magnets 5 and at the opposite end portions of the magnet cover 6 which extends beyond the opposite ends of the magnetic poles, an outer diameter of the magnet cover 6 is greater than an inner diameter of the magnetic poles, thus pressingly fixing the magnetic poles to the yoke 2. To the method for pressingly deforming the magnet cover 6 may be applied various methods of using a jig or tool for opening a pipe radially outwardly, of compressing a resin material in the axial direction to expand it radially outwardly and of applying an inner pressure by using liquid or gas.

Incidentally, it is possible to largely deform the inner circumferential end portions of the magnet cover 6 along bevelled portions at the opposite ends of the permanent magnets 5, as shown in FIG. 2b, thereby holding the magnets in intimate contact with the magnet cover 6. Moreover, if, as shown in FIG. 2b, inner diameters of a magnetic pole retaining portion 13a of the end bracket 13 for retaining the yoke 2 of the stator 1 and a magnetic pole retainer 12a of the gear case (bracket) 12 are selected to be smaller than the inner diameter of the yoke 2 and greater than the inner diameter of the magnetic poles, the magnetic poles may be effectively prevented from being displaced in the axial direction of the magnetic poles. For increasing a mechanical strength of the magnet cover 6 and preventing displacement of the magnetic poles due to vibration of the magnetic poles in the axial direction, such a structure is available that, as shown in FIG. 1, a flanged portion 6a having an outer diameter larger than the inner diameter of the magnetic poles and the inner diameter of the yoke 2 is provided at one end of the magnet cover 6 (on the end bracket 13 side), the flanged portion 6a is arranged to be clamped between the yoke 2 and the end bracket 13, and under the condition that the cylindrical portion of the magnet cover 6 is inserted into the inner circumferential surface of the magnetic poles in a "stop fit" manner, the magnet cover 6 is pressed radially outwardly in intimate contact with the inner circumferential surface of the magnetic poles. Also, such a structure may be applied to the magnet cover 6 that a planar magnetic metal material is wound in the form of a cylinder and the cylindrical material is pressingly deformed radially outwardly within an allowable limit of ductility of the metal material, thus firmly contacting the circumferential surface of the magnetic poles. In a relationship in thickness of the auxiliary poles 4 and the permanent magnets 5, even if, when it is necessary to increase the effect of the auxiliary poles 4 more than that of the permanent magnets 5, the thickness of the auxiliary poles 4 is greater than that of the permanent magnets 5 and, when it is necessary to increase the effect of the permanent magnets 5 more than that of the auxiliary poles 4, the thickness of the permanent magnets 5 is greater than that of the auxiliary poles 4, the magnets and auxiliary poles are, respectively, firmly fixed to the yoke 2 by the pressing deformation of the magnet cover 6 without any reduction in retaining force.

As described above, according to the embodiment of the invention, the stator of the magnet type DC motor is constructed so that the cylindrical magnet cover 6 made of a magnetic thin plate is deformed to be pressed against the inner circumferential surface of the magnetic poles. The plural auxiliary poles 4 and permanent magnets (ferrite magnets) 5 are mechanically firmly secured and protected at a predetermined position in the circumferential and axial directions of the inner surface of the yoke 2. In addition, the magnet cover 6 is in uniform contact with the inner circumferential surface of the magnetic poles at a uniform pressure. As a result, a true circular degree of the yoke 2 and hence the inner circumferential surface of the magnetic poles may be maintained so that a space between the armature 11 and the inner circumferential surface of the poles may be kept at a possible minimum and uniform, thereby reducing a magnetic loss to a possible minimum and improving an electric performance. According to a fixing method with the conventional bonding, since a thermal expansion coefficient of the yoke is different from that of the permanent magnets, when the adhesives are heated to cure and cooled to a room temperature, the true circular degree is liable to be degraded. According to the embodiment of the invention, it is advantageous that such a problem is obviated and the space between the auxiliary poles and the armature 11 is made smaller to reduce the magnetic loss by the magnet cover 6 made of the magnetic thin plate (steel plate) for the purpose of sufficiently utilizing the effect of the auxiliary poles in the DC motor which needs a much higher torque. Furthermore, according to the embodiment of the invention, the magnetic vibration of the magnet cover which would be liable to take place due to the space between the magnetic poles and the magnet cover may be suppressed or prevented.

Figure 3A:
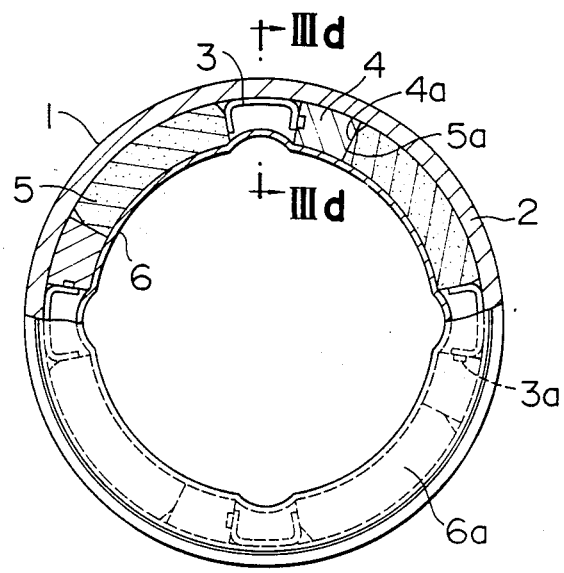
FIGS. 3a, 3b, 3c and 3d are a fragmentary cross-sectional view of a stator for a permanent magnet type DC motor in accordance with a second embodiment of the invention, an enlarged partial view of a retaining piece thereof, an enlarged view of the retaining piece as viewed from the inside, and a cross-sectional view, taken along the line IIId—IIId of FIG. 3a, showing the retaining piece.
Figure 3B:
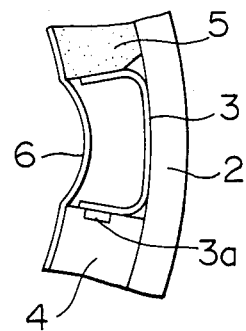
Figure 3C:
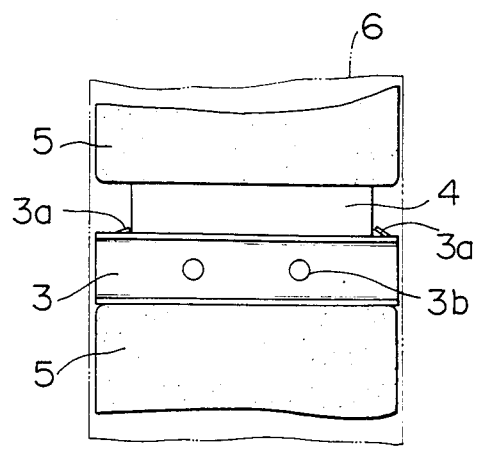
Figure 3D:
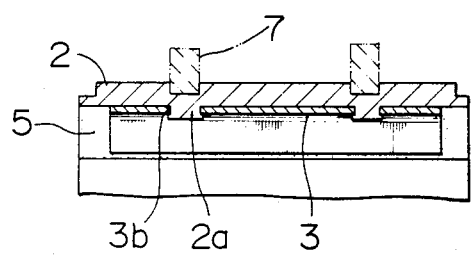

FIGS. 3a, 3b, 3c and 3d are, respectively, a transversal cross-sectional view showing a second embodiment of a stator 1 of a magnet type DC motor similar to that shown in FIG. 1 in accordance with the invention, an enlarged view showing a retaining metal piece shown in FIG. 3a, an enlarged view as viewed from the inside of the retaining metal piece shown in FIG. 3a, and a partial longitudinal view of the retaining metal piece taken along the line IIId—IIId of FIG. 3a. In FIGS. 3a to 3d, a plurality (four) of permanent magnets 5 (ferrite magnets or the like) and a plurality (four) of auxiliary poles 4 are arranged on the inner circumferential surface of the cylindrical yoke 2 so that an axially extending side face 5a of each of the permanent magnets 5 and a side face 4a of each of the auxiliary poles 4 are held in contact with each other and the other side faces of the permanent magnets and auxiliary poles confront with each other through retaining pieces 3 each having a U-shaped cross-section and made of a resilient or elastic material. Then, the cylindrical magnet cover or holder 6 made from a magnetic thin plate is provided in intimate contact with the inner circumferential surface of the magnetic poles. The retaining pieces 3 are fixed to a plurality (four) of positions of the inner circumferential surface of the yoke 2. At one side of each of the retaining pieces 3 on a side in contact with the associated auxiliary pole 4, there is a support portion 3a which extends from a cut portion of the side bent portion of the retaining piece 3 to be bent in an direction oblique with respect to the axial direction of the magnetic poles toward the centers of the magnetic poles. The respective auxiliary pole 4 is inserted in the axial direction and is fixed between the support portions 3a as shown in FIG. 3c. Each pair of the auxiliary pole 4 and the permanent magnet 5 held in contact with the associated auxiliary pole are held between the adjacent retaining pieces 3 at their sides. The magnetic poles as a whole are resiliently held on the inner circumferential surface of the yoke 2 by the tension of the sides of the retaining pieces 3. The support portions 3a formed close to both ends in the axial direction of the side of the retaining piece 3 may be formed by folding back from both the ends of the side of the retaining piece 3. As desired, the permanent magnet 5 may be held at a stationary position in the axial direction also on the other side in contact with the permanent magnet 5. However, the support portions 3a may not necessarily be formed in the sides of the retaining pieces 3. Also, in order to fix the retaining pieces 3 to the yoke 2, it is possible to support, in advance, the retaining pieces 3 onto the inner circumferential surface of the yoke 2 by molds, and to plastically deform parts of the yoke 2 through mounting holes 3b by press members 7 as shown in FIG. 3d, thereby firmly fixing the retaining pieces 3 to the yoke 2. Thus, the associated side faces 4a and 5a, extending in the axial direction and in the radially outward direction, of the auxiliary poles 4 and the permanent magnets 5 are brought into plane contact with each other. Furthermore, the retaining pieces 3 each having a U-shaped cross-section are interposed between the auxiliary poles 4 and the permanent magnets 5 while the side walls of the retaining pieces 3 are being resiliently deformed in the circumferential direction. In this manner, the magnetic poles as a whole are pressed against the inner circumferential surface of the yoke 2 with the auxiliary poles 4 and the permanent magnets 5 being pressed against each other in the circumferential direction by the resilient tension of the side walls of the retaining pieces 3.

On the other hand, the magnet cover or holder 6 is made of a cylindrical thin steel plate having a thickness of, for example, 0.15 to 0.3 mm. Flanged portions 6a each having an outer diameter greater than the inner diameter of the magnetic poles and the inner diameter of the yoke 2 are provided at opposite ends of the holder 6, as shown in FIGS. 1 and 3a, as desired. One of the flanged portion 6a is disposed between the yoke 2 and the end bracket 13. Under the condition that the cylindrical portion of the holder 6 is inserted and held on the circumferential surface of the magnetic poles in a "stop fit" fashion, the holder 6 is deformed by pressure from the inside so that the cylindrical portion of the holder 6 is held in intimate contact with the auxiliary poles 4 and the permanent magnets 5. At the same time, the cylindrical portion on the spaces of the retaining pieces 3 between the magnetic poles and the other end portion of the holder 6 on the gear case 12 side are also subjected to the pressure deformation so as to be deformed or expand radially outwardly from the inner circumferential surface of the magnetic poles. Thus, the total tension of the retaining pieces 3 and the magnet cover or holer 6 causes the magnet units to be completely prevented from moving in the circumferential direction and the axial direction so that the magnetic units are held firmly on the inner circumferential surface of the yoke 2. Also, the plastic deformed portions 2a of the yoke 2 are available to reduce the circumferential displacement of the magnetic poles against the reaction force or the like generated when the armature 11 rotates. The flanged portion 6a held between the yoke 2 and the end bracket 13 seves to prevent the displacement of the magnetic poles against the axial vibration or the like.

Referring to FIG. 3b, it is preferable that axially extending edges of the side walls of the retaining pieces 3 be retracted radially outwardly from the inner circumferential surfaces of the auxiliary poles 5 and the permanent magnets 5. This makes it possible to obviate such defects that, when the magnetic cover 6 is expanded from the inside by the pressure deformation, the magnetic cover 6 would be brought into abutment with the axially extending edges of the retaining pieces 3 and it would be impossible to deform the cover 6 in a desired shape as a result of which a sufficient retaining force would not be applied to the magnetic poles. It is also possible to bevel or chamfer the side walls and the end faces of the auxiliary poles 4 and the permanent magnets 5 as described in machine working or assembling. Also, in the second embodiment, in the same manner as in the first embodiment, without necessity of preforming the flanged portions, it is possible to insert the cylindrical magnet cover 6 into the magnetic poles, to subject it to the pressure deformation to come into intimate contact with the inner circumferential surface of the magnet cover 6 and at the same time to deform the outer diameter of the end portions of the magnet cover 6 to be greater than the inner diameter of the magnetic poles. This makes it possible to firmly fix the magnetic poles to the inner circumferential surface of the yoke 2. To insure the same effect, the inner diameters of magnetic pole receiving portions 13a and 12a of the end bracket 13 and the gear case 12 are selected to be greater than the inner diameter of the yoke. Furthermore, also to insure the fixture effect, the dimensional relationship in thickness of auxiliary poles 4 and the permanent magnets 5 is varied in accordance with a desired electric characteristic.

The structure for a stator of a permanent magnet type DC motor in which the auxiliary poles 4 and the permanent magnets 5 are held onto the inner circumferential surface of the yoke 2 by using the retaining pieces 3 made of resilient material and the magnet cover 6 made of magnetic thin plate in accordance with the second embodiment is simple and facilitates the assembling process. With such a structure, the plurality of auxiliary poles 4 and permanet magnets (ferrite magnets) 5 may be held at a predetermined position on the circumferential surface of the yoke with a satisfactory mechanical retaining force. Therefore, the structure is highly reliable without a fear of damage of the magnetic poles due to the thermal or mechanical stress, vibration and salt water invasion. Also, with an arrangement such that the magnet cover 6 made of magnetic thin plate is brought into intimate contact with the overall inner circumferential surface of the magnetic poles by the pressure deformation, the gap between the magnetic units and the armature 11 may be made small as much as possible and made uniform as in the first embodiment, suppressing a magnetic loss with a high electric performance such as torque characteristics. Thus, a mechanical durability against the shock which causes a crack to occur in the permanent magnets (ferrite magnets) 5 may be improved by about 50 to 100% of a conventional durability. Also, an electric performance is improved by about 5% of the conventional performance which is attained with adhesives. According to the invention, the magnetic resistance corresponding to the adhesive film thickness may be dispensed with.

As has been apparent from the foregoing description, according to the invention, the stator is constructed so that the cylindrical magnet cover or holder made of magnetic thin plate material is brought into intimate contact with the inner circumferential surfaces of the auxiliary poles and the permanent magnets located on the inner circumferential surface of the yoke, and/or in addition to the provision of the above-described magnet cover, the retaining pieces each having a U-shaped cross-section and made of resilient material are interposed in spaces between the auxiliary poles and the permanent magnets, whereby the magnetic poles may be mechanically firmly held on the inner circumferential surface of the yoke in a protective manner and the gap between the magnetic units and the armature may be made smaller and more uniform to enhance its electric performance.

We claim:
1. A permanent magnet type DC motor comprising:
  (a) a yoke having a substantially cylindrical shape;
  (b) a plurality of magnetic pole pairs of permanent magnets and auxiliary poles fixed to an inner circumferential surface of said yoke;
  (c) a rotor adapted to be disposed to confront with said permanent magnets and auxiliary poles adjacent to and along said permanent magnets and auxiliary poles;
  (d) an end bracket mechanically fixed to one end of said yoke;
  (e) means for rotatably supporting said rotor, said rotatably supporting means being fixed to said end bracket;
  (f) brush means fixed to said end bracket for supplying a DC current to an armature of said rotor; and
  (g) a cylindrical magnetic cover member pressingly deformed and fixed to the inner circumferential surface of said plurality of magnetic pole pairs for holding said magnetic pole pairs in intimate contact with said yoke solely by the resilient force thereof, said magnetic cover member extending in a rotational axial direction of said rotor beyond a length of said magnetic pole pairs, and having at both ends an outer diameter larger than an inner diameter of said magnetic pole pairs.

2. The DC motor according to claim 1, wherein part of said magnetic cover member is pressingly deformed into a space between the adjacent magnetic pole pairs disposed on the inner circumferential surface of said yoke.

3. The DC motor according to claim 1, further comprising magnetic pole fixing means including a U-shaped magnetic member, said U-shaped magnetic member being interposed in a space between the adjacent magnetic pole pairs disposed on the inner circumferential surface of said yoke.

4. The DC motor according to claim 3, wherein part of said magnetic cover member is pressingly deformed into a space between said magnetic pole pairs.

5. The DC motor according to claim 1, wherein one end of said magnetic cover member having an outer diameter larger than an inner diameter of said magnetic pole pairs is clamped between said yoke and said end bracket.

6. The DC motor according to claim 3, wherein said U-shaped magnetic member is provided with an aperture therein, and said yoke is plastically deformed through said aperture of said U-shaped magnetic member so as to firmly fix said U-shaped magnetic member to said yoke.

* * * * *